United States Patent
Xu

(10) Patent No.: US 12,395,276 B2
(45) Date of Patent: Aug. 19, 2025

(54) SIGNAL TRANSMISSION METHODS AND APPARATUSES, DEVICES AND STORAGE MEDIUM

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 355 days.

(21) Appl. No.: 17/887,288

(22) Filed: Aug. 12, 2022

(65) Prior Publication Data

US 2022/0385407 A1 Dec. 1, 2022

Related U.S. Application Data

(63) Continuation of application No. PCT/CN2020/075770, filed on Feb. 18, 2020.

(51) Int. Cl.
*H04L 1/18* (2023.01)
*H04L 1/1607* (2023.01)
*H04W 72/20* (2023.01)

(52) U.S. Cl.
CPC .............. *H04L 1/18* (2013.01); *H04L 1/1621* (2013.01); *H04W 72/20* (2023.01)

(58) Field of Classification Search
None
See application file for complete search history.

(56) References Cited

U.S. PATENT DOCUMENTS 11,006,401 B2 * 5/2021 Chatterjee ............. H04W 72/21

FOREIGN PATENT DOCUMENTS

| CN | 103795505 A | 5/2014 | |
|---|---|---|---|
| CN | 104811262 A | 7/2015 | |
| CN | 105812092 A | 7/2016 | |
| CN | 107707502 A | 2/2018 | |
| WO | WO-2016107169 A1 * | 7/2016 | ............... H04L 1/00 |
| WO | WO-2018111461 A1 * | 6/2018 | ........... H04L 1/0015 |
| WO | 2020020373 A1 | 1/2020 | |
| WO | WO-2020015617 A1 * | 1/2020 | ........... H04L 5/0053 |

OTHER PUBLICATIONS

International Search Report Dated Nov. 6, 2020 from International Application No. PCT/CN2020/075770.
Written Opinion of the International Searching Authority Dated Nov. 6, 2020 from International Application No. PCT/CN2020/075770.

(Continued)

*Primary Examiner* — Hong S Cho
(74) *Attorney, Agent, or Firm* — BAYES PLLC

(57) ABSTRACT

Signal transmission methods and apparatuses, a terminal device, a network device, and a storage medium are disclosed. By means of a target number of retransmissions, a signal to be transmitted is retransmitted multiple times, such that a terminal device with a reduced number of radio frequency channels can combine the gains of said signal by means of multiple retransmissions to obtain a signal to be transmitted with a greater gain, thereby expanding the coverage range of the terminal device.

16 Claims, 4 Drawing Sheets

(56) References Cited

OTHER PUBLICATIONS

ZTE, "Discussion on PDSCH/PUSCH Coverage Improvement", 3GPP TSG RAN WG1 Meeting #76 R1-140276, Feb. 10-14, 2014.
New Postcom, "UL Coverage Improvement and Evaluation for Low Cost MTC", 3GPP TSG-RAN WG1 Meeting #72bis R1-131120, Apr. 15-19, 2013.
The supplementary European search report dated Jan. 11, 2023 from European patent Application No. 20920522.8.
The Examination Report dated Sep. 2, 2024 from European patent application No. 20920522.8.

* cited by examiner

SIGNAL TRANSMISSION METHODS AND APPARATUSES, DEVICES AND STORAGE MEDIUM

CROSS-REFERENCE TO RELATED APPLICATION

This application is a continuation of International Application No. PCT/CN2020/075770 filed on Feb. 18, 2020, entitled "SIGNAL TRANSMISSION METHODS AND APPARATUSES, DEVICES AND STORAGE MEDIUM", which is incorporated herein by reference in its entirety.

TECHNICAL FIELD

The embodiments of the present application relate to the field of wireless communication technology, and more particularly, to signal transmission methods and apparatuses, devices, and a storage medium.

BACKGROUND

With the continuous evolution of communication technology, the internet of things (IoT) technology also develops rapidly. In addition, machine type communication (MTC) terminal devices with low cost, low power consumption, and wide coverage of scenarios have also appeared.

Because existing terminal devices supporting MTC usually have characteristics of low cost, low data rate, and high transmission delay, in order to meet some relatively high-rate IoT scenarios, such as video surveillance in intelligent security, conventional technologies reduce the cost of a new radio (NR) terminal device by reducing the number of radio frequency channels equipped in the NR terminal device. In addition, the NR terminal device with reduced cost is used as the terminal device of MTC to adapt to the relatively high-rate IoT scenarios.

Reducing the number of radio frequency channels of the terminal device can effectively reduce the cost of the terminal device, but this may lead to gain loss of the terminal device, affect a receiving performance of the terminal device, and then affect a downlink coverage of the terminal device.

SUMMARY

Based on the above, the present application provides a signal transmission method, an apparatus, a terminal device, a network device, and a storage medium.

In a first aspect, a signal transmission method includes: retransmitting a signal to be transmitted using a target number of retransmissions.

In a second aspect, a signal transmission method includes: receiving a signal to be transmitted that is retransmitted according to a target number of retransmissions.

In a third aspect, a signal transmission device includes: a transmitter configured to retransmit a signal to be transmitted using a target number of retransmissions.

In a fourth aspect, a signal transmission device includes: a receiver configured to receive a signal to be transmitted that is retransmitted according to a target number of retransmissions.

In a fifth aspect, a terminal device includes a transmitter, a memory, and a processor, and the memory stores a computer program,
the processor executes the computer program;
the transmitter is configured to retransmit a signal to be transmitted using a target number of retransmissions.

In a sixth aspect, a network device includes a receiver, a memory, and a processor, and the memory stores a computer program,
the receiver is configured to configured to receive a signal to be transmitted that is retransmitted according to a target number of retransmissions;
the processor executes the computer program.

In a seventh aspect, a computer-readable storage medium on which a computer program is stored, the steps of the method of the first aspect are implemented when the computer program is executed by a processor, or the steps of the method of the second aspect are implemented when the computer program is executed by the processor.

In an eighth aspect, a chip includes: a processor for calling and running a computer program from a memory, so that so that a device installed with the chip performs the steps of the method of the first aspect, or so that a device installed with the chip performs the steps of the method of the second aspect.

In a ninth aspect, a computer program product includes a computer program instruction that causes a computer to perform the method of the first aspect, or the computer program instruction causes the computer to perform the method of the second aspect.

In a tenth aspect, a computer program causes a computer to execute the method of the first aspect, or the computer program causes the computer to execute the method of the second aspect.

The signal transmission method, the device, the terminal device, the network device, and the storage medium retransmit the signal to be transmitted multiple times using the target number of retransmissions. This allows the terminal device that reduces the number of radio frequency passes to combine a gain of the signal to be transmitted through multiple retransmissions to obtain a signal to be transmitted with a larger gain, thereby expanding a coverage of the terminal device.

DETAILED DESCRIPTION OF ILLUSTRATED EMBODIMENTS

Figure 1:
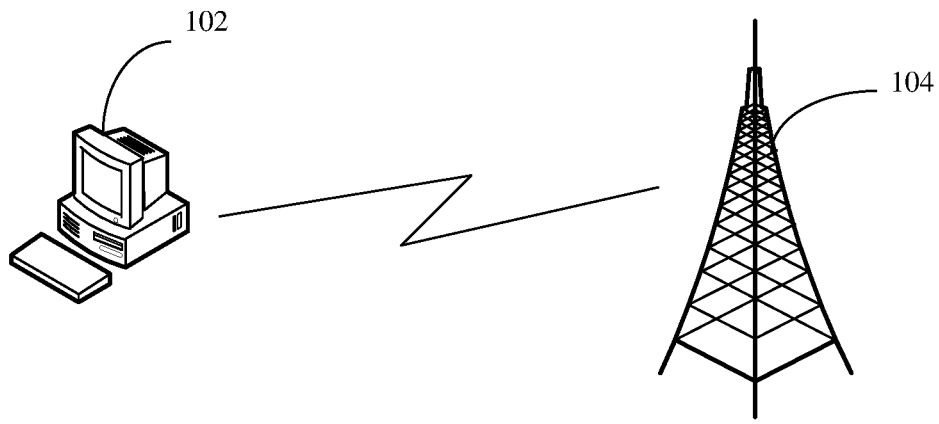
FIG. 1 is a schematic diagram of an application scenario of a signal transmission method provided by an embodiment of the present application.

In order to make the purpose, technical solutions, and advantages of the present application more clearly understood, the present application will be described in further detail below with reference to the accompanying drawings and embodiments. It should be understood that the specific embodiments described herein are only used to explain the present application, but not to limit the present application.

The following introduces some background-related knowledge involved in the embodiments of the present application.

With the continuous evolution of communication technology, the internet of things (IoT) technology also develops rapidly. In addition, machine type communication (MTC) terminal devices with low cost, low power consumption, and wide coverage of scenarios have also appeared.

Because existing terminal devices supporting MTC usually have characteristics of low cost, low data rate, and high transmission delay, in order to meet some relatively high-rate IoT scenarios, such as video surveillance in intelligent security, conventional technologies reduce the cost of a new radio (NR) terminal device by reducing the number of radio frequency channels equipped in the NR terminal device. In addition, the NR terminal device with reduced cost is used as the terminal device of MTC to adapt to the relatively high-rate IoT scenarios.

NR terminal devices need to support at least two receiving channels, and NR terminals on some frequency bands need to support four receiving channels. Each receiving channel includes components such as a receiving antenna, a filter, a power amplifier (PA) power amplifier, analog-to-digital (AD) sampler, etc. Therefore, reducing the number of radio frequency (RF) channels of NR terminal devices can significantly reduce the terminal cost. By reducing the two RF channels to one RF channel, the cost of the terminal devices can be reduced by about ⅓. Although reducing the number of radio frequency channels of the terminal devices can effectively reduce the cost, the reduction of the number of receiving antennas reduces the received signal power, which affects a receiving performance and thus the coverage. For example, if the number of receiving antennas of the terminal devices is reduced from 2 to 1, the received signal power may lose about 3 dB.

At this stage, there are also NR-light terminal devices, such as smart wearable devices. Due to the size of the device, a size of a radio frequency antenna of the terminal device is limited. Therefore, a gain of the radio frequency antenna cannot reach a performance of a gain of a radio frequency antenna of a common terminal. Therefore, under the limitation of the same transmit power, a coverage of the NR-light terminal device is smaller.

In some scenarios, such as industrial monitoring scenarios, a communication module may be placed in an area blocked by a metal object (such as a robotic arm), such that a network signal strength may be lost. For such work scenarios, it is also necessary to design coverage enhancement schemes to compensate for performance losses.

The data transmission method provided by the present application can solve the technical problem that a downlink coverage of the existing terminal device is small. It should be noted that the data transmission method of the present application is not limited to solving the above technical problem but can also be used to solve other technical problems, which is not limited in the present application.

FIG. 1 is a schematic diagram of an application scenario of a data transmission method provided by an embodiment of the present application. As illustrated in FIG. 1, the scenario includes a network device 104 and a terminal device 102. The terminal device 102 communicates with the network device 104 through a network. The terminal device 102 can provide gain combining by retransmitting a signal to be transmitted and improve a signal strength received by the network device, so as to solve a gain loss caused by reducing the number of radio frequency channels.

The terminal device 102 may be a wireless terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, a user device (or user equipment). The present disclosure is not limited thereto.

The network device 104 may further be a base station (BTS) in a global system for mobile communications (GSM) or code division multiple access (CDMA) or may be a NodeB (NB) in wideband code division multiple access (WCDMA) or may further be an evolved NodeB (evolutional NodeB, eNB or eNodeB for short) in LTE, or a relay station or an access point, or a base station in a future 5G network, or the like. This is not limited herein. A second terminal device 202 may be a wireless terminal or a wired terminal. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, a user device (or user equipment). The present disclosure is not limited thereto.

The technical solutions of the present application and how the technical solutions of the present application solve the above-mentioned technical problems will be described in detail below with specific examples. The following specific embodiments may be combined with each other, and the same or similar concepts or processes may not be repeated in some embodiments. The embodiments of the present application will be described below with reference to the accompanying drawings.

In one embodiment, this embodiment relates to a specific process of improving a coverage of a terminal device by retransmitting a signal to be transmitted. The method includes retransmitting a signal to be transmitted using a target number of retransmissions.

The target number of retransmissions may be the number of retransmissions preset in the terminal device. For example, the target number of retransmissions may be preset according to a gain of a receiving channel of the terminal device. It may also be the number of retransmissions determined according to information indicating the target number of retransmissions, which is not limited in this embodiment of the present application. It should be noted that, the information used to indicate the target number of retransmissions may be sent by a network device to the terminal device, or may be sent by other terminal devices, which is not limited in this embodiment of the present application. When receiving the information indicating the target number of retransmissions, it may be received by receiving radio resource control (RRC) signaling, can also be received by receiving control information, or can also be received by receiving a media access control control element (MAC CE), which is not limited in this embodiment of the present application.

When the signal to be transmitted needs to be retransmit, a gain of the signal to be transmitted is enhanced, and the coverage of the signal is increased by retransmitting the signal to be transmitted of the target number of retransmissions. Each time the signal to be transmitted is sent more than once, gains of the signal to be transmitted sent each time may be combined to enhance a signal gain of the signal to be transmitted. For example, sending the signal to be transmitted twice is equivalent to doubling the power of the signal sent once, resulting in a signal gain of 10 log 2=3 dB. Sending the signal to be transmitted 10 times is equivalent to increasing the power of the signal sent once by 10 times, resulting in a signal gain of 10 log 10=10 dB. The greater the signal gain of the signal to be transmitted, the wider the coverage of the terminal device. That is to say, by resending the signal to be transmitted for many times, the coverage of the terminal device can be improved.

The signal transmission method adopts the target number of retransmissions to retransmit the signal to be transmitted multiple times. This enables the terminal device that reduces the number of RF passes to combine the gain of the signal to be transmitted by retransmissions multiple times to obtain the signal to be transmitted with a larger gain, thereby expanding the coverage of the terminal device.

As a location or a surrounding environment of the terminal device changes, the number of times the terminal device needs to retransmit the signal also changes accordingly. This can quickly adapt to changes in the number of retransmissions caused by changes in the location or the surrounding environment of the terminal device by receiving the information indicating the target number of retransmissions carried in the downlink control information sent in real time. A detailed description is given below with reference to FIG. 2.

Figure 2:
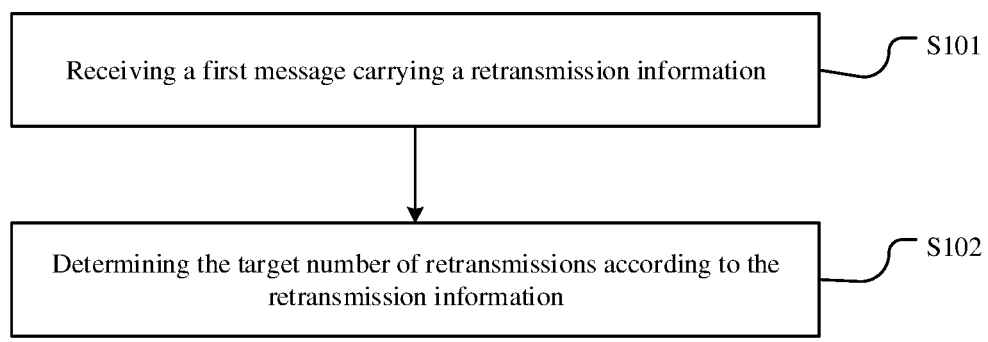
FIG. 2 is a flowchart of a signal transmission method provided by an embodiment.
Figure 3:
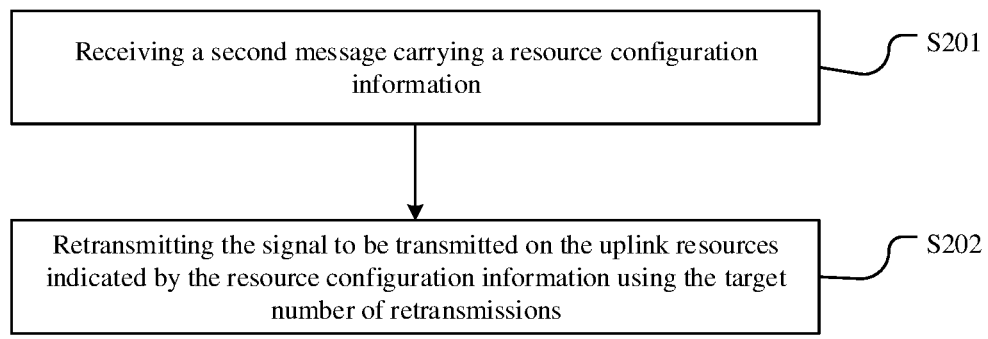
FIG. 3 is a flowchart of a signal transmission method provided by an embodiment.

FIG. 2 is a schematic flowchart of a signal transmission method in an embodiment. As shown in FIG. 2, the method includes the following steps:

S101, receiving a first message carrying retransmission information; wherein the retransmission information is used to indicate the target number of retransmissions of the signal to be transmitted on a terminal device; wherein the first message includes downlink control information (DCI).

The first message may be the downlink control information. The downlink control information is usually sent by the network device to the terminal device when the control information is exchanged between the network device and the terminal device. The terminal device sends the uplink control information to the network device according to the downlink control information. The downlink control information is usually sent directly to the terminal device through a physical layer. Compared with signaling of higher layers, such as RRC signaling, when sending the downlink control information, it does not need to be transmitted layer by layer through higher layers to lower layers. That is, it is not necessary to perform processing such as packetizing and unpacking the signaling when it is not required to be transmitted layer by layer. That is to say, the downlink control information is relatively concise. In addition, compared with signaling of higher layers, the downlink control information does not need to carry other configuration information at the same time, and can carry information indicating the target number of retransmissions alone. That is, the carried information that indicates the target number of retransmissions can be adjusted at any time, and the flexibility is high.

When the signal to be transmitted is retransmitted, there is a possible situation that resources used for the signal to be transmitted to be retransmitted are configured as resources that do not match the signal to be transmitted. For example, the signal to be transmitted is an uplink signal. Based on the configuration information of a slot configuration, the terminal device determines that allocated symbols in an uplink channel of a slot include downlink transmission symbols. Then, when the terminal device retransmits the signal to be transmitted, it can only use other symbols in the slot except the downlink transmission symbols. Therefore, there is a possible situation that the number of symbols available for retransmission in this slot is less than the number of symbols required to retransmit the signal to be transmitted, and the uplink transmission in this slot will be cancelled. Optionally, the target number of retransmissions is a preset number of retransmissions plus a preset value. The preset value is a value determined according to the transmission attribute of each symbol in the slot. The transmission attribute is used to indicate whether the signal to be transmitted can be transmitted in symbols. The preset number of retransmissions may be a preset fixed number of retransmissions. For example, the preset number of retransmissions may be the number of retransmissions sent to the terminal device through RRC signaling in the conventional method. In the conventional method, when there is a slot in which the number of symbols for retransmission is smaller than the number of symbols required to retransmit the signal to be transmitted, the slot cannot transmit the signal to be transmitted. This slot is still usually counted in the number of retransmissions, resulting in the actual number of retransmissions being less than the required number of retransmissions. Retransmission information is carried in the downlink control information with higher real-time performance. The indicated target number of retransmissions is the preset number of retransmissions plus a preset value. The preset value is a value determined according to the transmission attribute of each symbol in the slot. The transmission attribute is used to indicate whether the signal to be transmitted can be transmitted in symbols. This can effectively avoid the above situation. For example, the number of retransmissions actually needs to be 5 times, and the target number of retransmissions indicated in the retransmission information is 8 times. Even if there are individual slots that cannot be transmitted, the total number of retransmissions can still meet the actual demand.

The repeated transmission information is used to indicate the target number of retransmissions of the signal to be transmitted on the terminal device, which may be a value indicating the target number of retransmissions, or may be identification information indicating the target value, which is not limited in this embodiment of the present application.

S102, determining the target number of retransmissions according to the retransmission information.

When the retransmission information is obtained from the first message, the target number of retransmissions indicated by the retransmission information may be determined according to the specific form of the retransmission information. For example, when the retransmission information is a value indicating the number of retransmissions, the value is used as the target number of retransmissions. When the retransmission information is identification information indicating the target value, the target value indicated by the identification information may be determined, and the target value may be used as the target number of retransmissions.

In the above signal transmission method, the first message carrying the retransmission information indicating the target number of retransmissions of the signal to be transmitted is received. According to the retransmission information, the target number of retransmissions is determined. The first message includes downlink control information. When the first message is the downlink control information, compared with signaling of higher layers, the downlink control information carries retransmission information, and the target number of transmissions can be adjusted in time according to changes in the location or the surrounding environment of the terminal device. This enables the target number of retransmissions used for retransmission of the signal to be transmitted and can adapt to changes in the location or the surrounding environment of the terminal device in a timelier manner.

In one embodiment, the retransmission information includes the target number of retransmissions of the signal to be transmitted, or an identifier of the target number of retransmissions.

When the retransmission information is the identifier of the target number of retransmissions, optionally, the identifier of the target number of retransmissions is a target sequence number of the target number of retransmissions in a set of the retransmissions. The set of retransmissions is a preset set of numbers, or the set of retransmissions is a set of numbers configured according to a pre-configured indication. The preset set of numbers may be a set formed by multiple retransmissions determined according to a performance of the terminal device itself. The set of numbers configured according to the pre-configured indication may be a set of numbers determined according to the retransmissions indicated in the received configuration indication. Optionally, the set of retransmissions includes at least one candidate sequence number, and each candidate sequence number corresponds to one repeated transmission number. For example, the set of repeated transmission times {8, 10, 12, 18} includes 4 candidate sequence numbers, which are 1, 2, 3, and 4, respectively. The number of retransmissions corresponding to the candidate sequence number 1 is 8, and the number of retransmissions corresponding to the candidate sequence number 2 is 10. The number of retransmissions corresponding to the candidate sequence number 3 is 12, and the number of retransmissions corresponding to the candidate sequence number 4 is 18.

Optionally, the number of retransmissions corresponding to the target sequence number is determined as the target number of retransmissions.

For example, the identifier of the target number of retransmissions in the retransmission information may be represented by 2 bits, which are used to indicate the target sequence number in the set of retransmissions. For example, "00" represents the candidate sequence number 1 in a set of retransmissions, and "01" represents the candidate sequence number 2 in a set of retransmissions. "10" represents the candidate sequence number 3 in a set of retransmissions, and "11" represents the candidate sequence number 4 in a set of retransmissions. When the identifier of the target number of retransmissions in the received retransmission information is 01, the target sequence number of the target retransmissions in the set of retransmissions is 2. The corresponding target number of retransmissions is the value 10 corresponding to the candidate sequence number 2 of the set of retransmissions {8, 10, 12, 18}.

The above embodiments focus on describing the specific process of how to determine the target number of retransmissions according to the received first message. The following embodiments describe in detail how to determine the uplink resources used for retransmitting the signal to be repeated.

In one embodiment, the uplink resources used for retransmitting the signal to be transmitted are the same each time, or the uplink resources used for retransmitting the signal to be transmitted are different each time.

The uplink resources used for retransmitting the signal to be transmitted each time may refer to symbol resources occupied by the signal to be transmitted, and the uplink resources used for each retransmission of the signal to be transmitted may be the same or different. Optionally, the signal to be transmitted includes an uplink control signal and a sounding reference signal (SRS).

For example, the signal to be transmitted is resent 5 times through 5 slots, and the symbol resources occupied by the 5 times of retransmissions of the signal to be transmitted are the same, which are the first 5 symbol resources in each slot. It is understood that the symbol resources occupied by the five repetitions of sending the signal to be transmitted may also be different. For example, sending the resource to be transmitted in the first slot may be symbols 0-4 in the first slot. Sending resources to be transmitted in the second slot may be symbols 1-5 in the second slot. Sending resources to be transmitted in the third slot may be symbols 2-6 in the third slot. Sending resources to be transmitted in the fourth slot may be symbols 3-7 in the fourth slot. Sending the resource to be transmitted in the fifth slot may be symbols 4-8 in the fifth slot. There is also a situation that when the signal to be transmitted is resent, the uplink resources occupied by some slots are the same. For example, the signal to be transmitted is retransmitted 5 times. The symbols occupied in the first slot, the third slot and the fifth slot are the same, which are symbols 1-5. The symbols occupied in the second slot and the fourth slot are the same, which are symbols 3-7.

The terminal device may determine the uplink resource used by the signal to be transmitted according to receiving the second message carrying the resource configuration information. In one embodiment, the method further includes:

S201, receiving a second message carrying resource configuration information; wherein the resource configuration information is used to indicate uplink resources used for retransmissions of the signal to be transmitted; wherein the second message comprises a radio resource control signaling, downlink control information, or an MAC CE.

The resource configuration information is used to indicate uplink resources used for retransmission of the signal to be transmitted. The resource configuration information may be a symbol used to directly indicate retransmission of the signal to be transmitted. The configuration parameter may also be sent, so that the terminal device determines, according to the configuration parameter and the corresponding calculation method, the symbols used in the retransmission of the signal to be transmitted. This embodiment of the present application does not limit this. The above resource configuration information may be carried in the second message. When the terminal device receives the second message, it can acquire resource configuration information from the second message, and then determine the uplink resources used for retransmission of the signal to be transmitted according to the resource configuration information. The second message may include radio resource control signaling, downlink control information, or MAC CE. That is to say, the terminal device may receive the resource configuration information when receiving RRC signaling or MAC CE and may also receive resource configuration information sent to the terminal device when receiving DCI, which is not limited in this embodiment of the present application.

S202, retransmitting the signal to be transmitted on the uplink resources indicated by the resource configuration information using the target number of retransmissions.

In the above signal transmission method, the terminal device can receive a radio resource control signaling, downlink control information, or MAC CE that carries the resource configuration information indicating uplink resources used for retransmission of the signal to be transmitted. The terminal device uses the target number of retransmissions to retransmit the signal to be transmitted on the uplink resources indicated by the resource configuration information. That is to say, the terminal device can receive the resource configuration information through various types of messages, which improves the flexibility of acquiring the resource configuration information.

Figure 4:
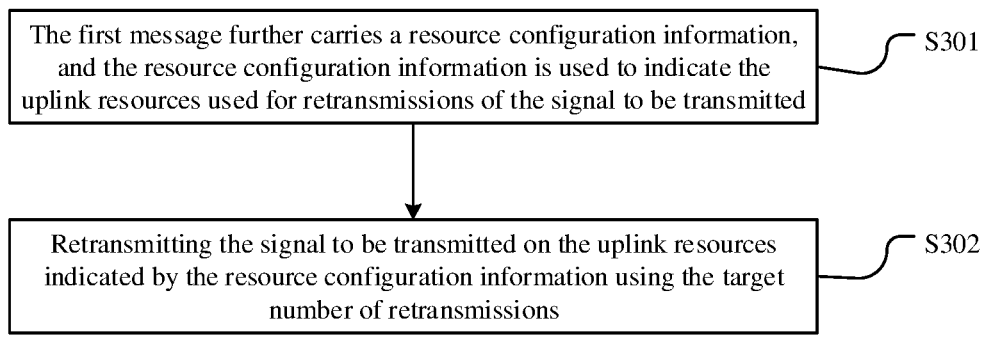
FIG. 4 is a flowchart of a signal transmission method provided by an embodiment.

In one embodiment, the resource configuration information may also be carried in the first message carrying the retransmission information. This enables the terminal device to obtain the retransmission information and resource configuration information at the same time when the terminal device receives the first message. As illustrated in FIG. 4, the method further includes the following steps:

S301, the first message further carries resource configuration information, and the resource configuration information is used to indicate the uplink resources used for retransmissions of the signal to be transmitted.

The first message carries the retransmission information and the resource configuration information, and the first message may be downlink control information with higher real-time performance. When receiving the first message, the terminal device can determine the target number of retransmissions of the signal to be transmitted according to the retransmission information carried in the first message, and also determine the uplink resources used for retransmission of the signal to be transmitted according to the resource configuration information.

S302, retransmitting the signal to be transmitted on the uplink resources indicated by the resource configuration information using the target number of retransmissions.

In the above signal transmission method, the first message further carries the uplink resource used to indicate the retransmission of the signal to be transmitted. The terminal device may acquire resource configuration information when receiving the first message. The first message may be downlink control information with higher real-time performance. This enables the used uplink resources to be adjusted in time according to changes in the terminal device when the terminal device retransmits the signal to be transmitted, which improves the uplink resource utilization rate for resending the signal to be transmitted.

In an embodiment, the resource configuration information is a resource configuration parameter or a set of resource configuration parameters; wherein the resource configuration parameter is used to determine the uplink resources used for retransmissions of the information to be transmitted; wherein the set of resource configuration parameters includes at least one resource configuration parameter and a corresponding relationship between each resource configuration parameter and a number of transmissions.

Optionally, if the resource configuration information is a resource configuration parameter, the uplink resource used for each retransmission of the signal to be transmitted is determined according to the resource configuration parameter. The terminal device may determine the same uplink resource for each retransmission of the signal to be transmitted according to the resource configuration parameter. Optionally, the resource configuration parameter includes a resource block offset and/or an uplink resource index number. The resource configuration parameter can be a resource block offset $RB_{BWP}^{offset}$, or an uplink resource index number $r_{PUCCH}$, and can also be $RB_{BWP}^{offset}$ and $r_{PUCCH}$. In a possible case, the resource configuration parameter is the resource block offset of an i-th slot, which can be determined according to the formula:

$$RB_{BWP, slot\ i+1}^{offset} = (RB_{BWP, slot\ i}^{offset} + \text{delta}RB) \bmod N_{BWP}^{size}$$

Determine resource configuration parameters for other slots. $RB_{BWP,\ slot\ i}^{offset}$ represents the resource block offset corresponding to the i-th slot, deltaRB is the resource block offset and is represented by the number of PRBs. $N_{BWP}^{size}$ indicates the number of resource blocks within a bandwidth in the uplink. When the terminal device obtains the resource block offset and/or the uplink resource index number, it can determine the uplink resource used for sending the signal to be transmitted from Table 1 according to the resource block offset and/or the uplink resource index number.

Figure 5:
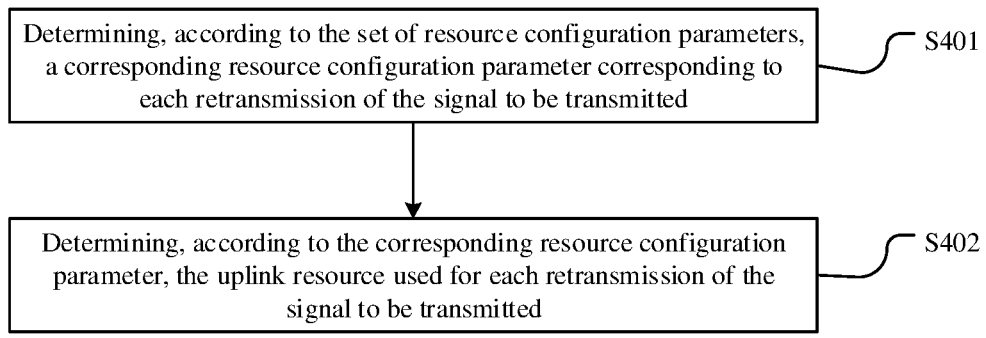
FIG. 5 is a flowchart of a signal transmission method provided by an embodiment.

Optionally, if the resource configuration information is a set of resource configuration parameters, the uplink resources used for each transmission of the signal to be transmitted may be determined through the steps of the method illustrated in FIG. 5. As illustrated in FIG. 5, the method includes:

S401, determining, according to the set of resource configuration parameters, a corresponding resource configuration parameter corresponding to each retransmission of the signal to be transmitted, S402, determining, according to the corresponding resource configuration parameter, the uplink resource used for each retransmission of the signal to be transmitted.

TABLE 1

| Index number | Format of uplink control channel | First symbol | Number of symbols | Resource block offset | Initial cs index set |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0,6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $[N^{SIZE}_{BWP}/4]$ | {0, 3, 6, 9} |

It can be known from the description of the above embodiments that the set of resource configuration parameters includes at least one resource configuration parameter and the corresponding relationship between each resource configuration parameter and the number of transmissions. It may be that multiple transmissions correspond to one resource configuration parameter, or one transmission may correspond to one resource configuration parameter, which is not limited in this embodiment of the present application. For example, when the target number of retransmissions of the signal to be transmitted is 5, the set of resource configuration parameters includes 3 resource configuration parameters. The first retransmission and the second retransmission correspond to the first resource configuration parameter. The third retransmission and the fourth retransmission correspond to the second resource configuration parameter. The fifth retransmission corresponds to the third resource configuration parameter. That is to say, the first resource configuration parameter is used to determine the uplink resources used for the first and second retransmissions of the signal to be transmitted. The second resource configuration parameter is used to determine the uplink resources used for the third and fourth retransmissions of the signal to be transmitted. The third resource configuration parameter is used to determine the uplink resources used for the fifth retransmission of the signal to be transmitted.

The resource configuration information in the above signal transmission method only includes the resource configuration parameter used to indicate uplink resources used for secondary transmission of the signal to be transmitted or a set of resource configuration parameters. In a possible case, the resource configuration information further includes an indication of similarities and differences of retransmission resources. The indication of similarities and differences of retransmission resources represents whether the configuration of uplink resources used for retransmission of the signal to be transmitted is the same each time.

In an embodiment, the resource configuration information includes: an indication of similarities and differences of retransmission resources, and/or a resource configuration parameter; the indication of similarities and differences of retransmission resources is used to indicate whether a configuration of uplink resources used is the same for each retransmission of the signal to be transmitted; the resource configuration parameter is used to enable the terminal device to determine the uplink resources used for each retransmission of the information to be transmitted.

Optionally, if the resource configuration information is the indication of similarities and differences of retransmission resources, or if the resource configuration information is the indication of similarities and differences of retransmission resources and the resource configuration parameter, the second message is downlink control information.

When the resource configuration information is the indication of similarities and differences of retransmission resources, or the resource configuration information is the indication of similarities and differences of retransmission resources and the resource configuration parameter, that is, when the resource configuration information includes the indication of similarities and differences of retransmission resources, the resource configuration information is carried in the downlink control information. In one case, when the resource configuration information does not include the indication of similarities and differences of retransmission resources, for example, when the resource configuration information is a resource configuration parameter, the resource configuration information may be carried in an RRC signaling, an MAC CE, or downlink control information.

Optionally, if the indication of similarities and differences of retransmission resources indicates that the configuration of uplink resources used for each retransmission of the signal to be transmitted is different, the resource configuration parameter includes the resource configuration parameter for each retransmission of the signal to be transmitted.

Optionally, if the indication of similarities and differences of retransmission resources indicates that the configuration of uplink resources used for each retransmission of the signal to be transmitted is different, the resource configuration parameter includes a resource configuration parameter for an i-th transmission of the signal to be transmitted, and according to the resource configuration parameter for the i-th transmission of the signal to be transmitted and a preset offset, a resource configuration parameter for other transmissions of the signal to be transmitted is determined.

When the indication of similarities and differences of retransmission resources indicates that the configuration of uplink resources used for each retransmission of the signal to be transmitted is different, the resource configuration parameter includes a resource configuration parameter for an i-th transmission of the signal to be transmitted, and according to the resource configuration parameter for the i-th transmission of the signal to be transmitted and a preset offset, a resource configuration parameter for other transmissions of the signal to be transmitted is determined. The value range of i is from 1 to the target number of retransmissions, and i is a positive integer. For example, the resource configuration parameter is the resource block offset $RB_{BWP}^{offset}$ of an i-th slot, and the resource configuration parameters of other slots can be determined according to the formula $RB_{BWP, slot\ i+1}^{offset} = (RB_{BWP, slot\ i}^{offset} + deltaRB) \bmod N_{BWP}^{size}$, $RB_{BWP, slot\ i}^{offset}$ represents the resource block offset corresponding to the i-th slot, deltaRB is the offset of the resource block and is represented by the number of PRBs. $N_{BWP}^{size}$ indicates the number of resource blocks within a bandwidth in the uplink.

The above embodiments focus on how to determine the uplink resource for sending the signal to be transmitted. The following will focus on describing the specific process of how to determine a target beam to which the user retransmits the signal to be transmitted. The target beam used to transmit the signal to be transmitted may refer to a spatial transmission filter. In one embodiment, the target beam used for retransmitting the signal to be transmitted is the same each time, or the target beam used for retransmitting the signal to be transmitted is different each time.

The terminal device can send multiple retransmission signals to be transmitted through the same target beam and increase signal powers of the signals to be transmitted through spatial diversity gains of the multiple retransmission signals to be transmitted. The terminal device can also transmit the signals to be transmitted which are retransmitted through different target transmit beams. For example, the terminal device may resend the signal to be transmitted through a target beam or may resend the signal to be transmitted 5 times when necessary. The terminal device may send the signal to be transmitted for the first time through the first target beam, send the signal to be transmitted for the second time through the second target beam, send the signal to be transmitted for the third time through the third target beam, send the signal to be transmitted for the fourth time through the fourth target beam, and send the signal to be transmitted for the fifth time through the fifth target beam. In a possible situation, the signals to be transmitted for the 1st to 3rd repetitions may also be sent through the first target beam, and the signals to be transmitted for the 4th to 5th repetitions are sent through the second target beam.

Figure 6:
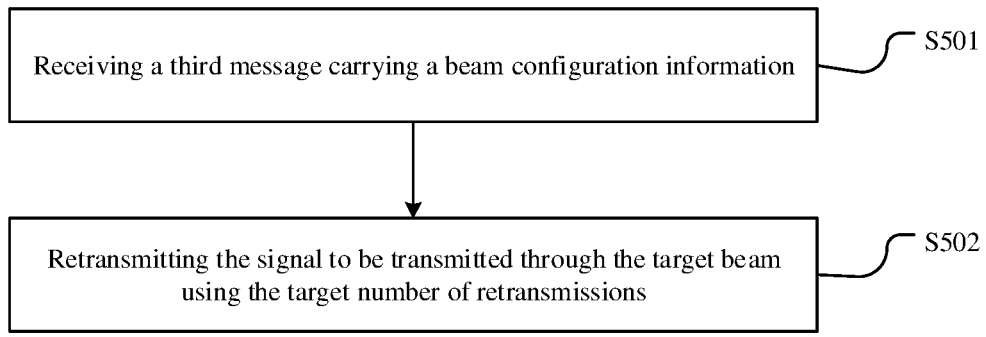
FIG. 6 is a flowchart of a signal transmission method provided by an embodiment.

The terminal device may determine the target beam used for the signal to be transmitted according to the third message that is received carrying the resource beam configuration information. In one embodiment, as illustrated in FIG. 6, the method further includes:

S501, receiving a third message carrying beam configuration information; wherein the beam configuration information is used to indicate the target beam used for retransmissions of the signal to be transmitted; wherein the third message includes a radio resource control signaling, downlink control information, or an MAC CE.

The beam configuration information is used to indicate the target beam used when the signal to be transmitted is retransmitted. For example, the beam configuration signal may indicate the sequence number of the beam. The terminal device determines, according to a serial number of the beam, the target beam used for complex transmission of the signal to be transmitted. The above beam configuration information may be carried in the third message. When the terminal device receives the third message, it can obtain the beam configuration information from the third message, and then determine the target beam used when retransmitting the signal to be transmitted according to the beam configuration information. The third message may include a radio beam control signaling, downlink control information, or an MAC CE. That is to say, the terminal device may receive the beam configuration information when receiving an RRC signaling or an MAC CE and may also receive the beam configuration information sent to the terminal device when receiving DCI, which is not limited in this embodiment of the present application.

S502, retransmitting the signal to be transmitted through the target beam using the target number of retransmissions.

In the above signal transmission method, the terminal device can receive a radio beam control signaling, downlink control information, or an MAC CE that carries the beam configuration information indicating the target beam used when the signal to be transmitted is retransmitted. The terminal device may use the target number of retransmissions to retransmit the signal to be transmitted on the target beam indicated by the beam configuration information. That is to say, the terminal device can receive the beam configuration information through various types of messages, which improves flexibility of acquiring the beam configuration information.

In an embodiment, the first message further carries beam configuration information, and the beam configuration information is used to indicate a target beam used for retransmissions of the signal to be transmitted. The signal to be transmitted is transmitted through the target beam using the target number of retransmissions.

The first message carries retransmission information and beam configuration information, and the first message may be downlink control information with higher real-time performance. When receiving the first message, the terminal device can determine the target number of retransmissions of the signal to be transmitted according to the retransmission information carried in the first message and determine the target beam used for retransmission of the signal to be transmitted according to the beam configuration information.

In the above signal transmission method, the first message further carries beam configuration information used to indicate the target beam used when the signal to be transmitted is retransmitted. The terminal device may acquire the beam configuration information when receiving the first message. The first message may be downlink control information with higher real-time performance. This enables the target beam used to be adjusted in time according to changes in the terminal device when the terminal device retransmits the signal to be transmitted.

In an embodiment, the beam configuration information is a beam configuration parameter or a set of beam configuration parameters; the beam configuration parameter is used to enable the terminal device to determine the target beam used for each retransmission of the information to be transmitted; the set of beam configuration parameters includes at least one beam configuration parameter and a corresponding relationship between each beam configuration parameter and a number of transmissions.

Figure 7:
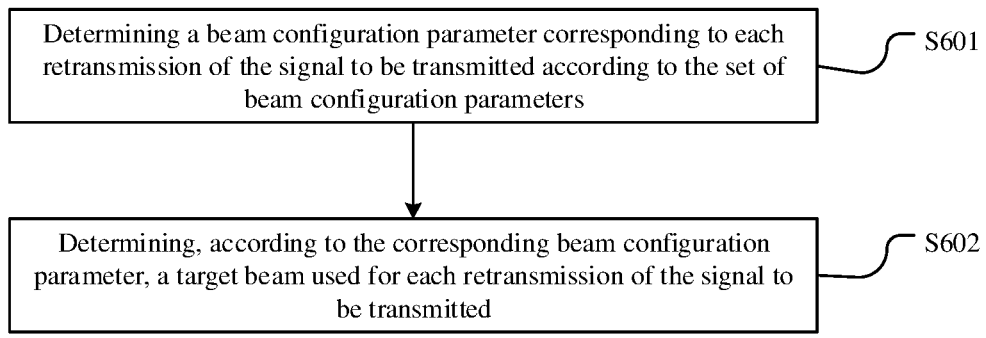
FIG. 7 is a flowchart of a signal transmission method provided by an embodiment.

Optionally, if the beam configuration information is the beam configuration parameter, as illustrated in FIG. 7, the method further includes:

S601, determining a beam configuration parameter corresponding to each retransmission of the signal to be transmitted according to the set of beam configuration parameters.

S602, determining, according to the corresponding beam configuration parameter, a target beam used for each retransmission of the signal to be transmitted.

It can be known from the description of the above embodiments that the set of beam configuration parameters includes at least one beam configuration parameter and the corresponding relationship between each beam configuration parameter and the number of transmissions. It may be one beam configuration parameter corresponding to multiple transmissions, or one beam configuration parameter corresponding to one transmission, which is not limited in this embodiment of the present application. For example, when the target number of retransmissions of the signal to be transmitted is 5, the set of beam configuration parameters includes 3 beam configuration parameters. The first retransmission and the second retransmission correspond to the first beam configuration parameter. The third retransmission and the fourth retransmission correspond to the second beam configuration parameter. The fifth retransmission corresponds to the third beam configuration parameter. That is to say, the first beam configuration parameter is used to determine the target beam used for the first and second retransmissions of the signal to be transmitted. The second beam configuration parameter is used to determine the target beam used for the third and fourth retransmissions of the signal to be transmitted. The third beam configuration parameter is used to determine the target beam used for the fifth retransmission of the signal to be transmitted.

In the above signal transmission method, the beam configuration information only includes a beam configuration parameter used to indicate the uplink beam used for secondary transmission of the signal to be transmitted or a set of beam configuration parameters. In a possible case, the above beam configuration information includes an indication of similarities and differences of retransmission beams and/or a beam configuration parameter; the indication of similarities and differences of retransmission beams is used to indicate whether the target beam used for each retransmission of the signal to be transmitted is the same; the beam configuration parameter is used to enable the terminal device to determine the target beam used for each retransmission of the information to be transmitted.

In an embodiment, if the beam configuration information is the indication of similarities and differences of retransmission beams, or if the beam configuration information is the indication of similarities and differences of retransmission beams and the beam configuration parameter, the third message is downlink control information.

When the beam configuration information is the indication of similarities and differences of retransmission beams, or the beam configuration information is the indication of similarities and differences of retransmission beams and the beam configuration parameter, that is, when the beam configuration information includes the indication of similarities and differences of retransmission beams, the beam configuration information is carried in the in downlink control information. In one case, when the beam configuration information does not include the indication of similarities and differences of retransmission beams, for example, when the beam configuration information is a beam configuration parameter, the beam configuration information may be carried in an RRC signaling, an MAC CE, or downlink control information.

Optionally, if the indication of similarities and differences of retransmission beams indicates that the target beam used for each retransmission of the signal to be transmitted is different, the beam indication information is used to indicate the target beam used for each transmission of the signal to be transmitted.

Optionally, if the indication of similarities and differences of retransmission beams indicates that the target beam used for each transmission of the signal to be transmitted is a different beam, the beam indication information is used to indicate a beam used for a j-th transmission of the signal to be transmitted. According to the beam for the j-th transmission of the signal to be transmitted, a beam for other transmissions of the signal to be transmitted is determined. The value range of j is from 1 to the target number of retransmissions, and j takes a positive integer.

The execution subject of the above embodiment is a terminal device 102 illustrated in FIG. 1, and the following focuses on the description of the signal transmission method when the execution subject is a network device 104 illustrated in FIG. 1.

In an embodiment, the method includes receiving signal to be transmitted that is retransmitted according to a target number of retransmissions.

For receiving a signal to be transmitted that is retransmitted according to a target number of retransmissions, optionally, a network device transmits a first message carrying retransmission information; wherein the retransmission information is used to indicate the target number of retransmissions of the signal to be transmitted on a terminal device; wherein the first message includes downlink control information.

In an embodiment, optionally, the network device transmits a second message carrying resource configuration information, wherein the resource configuration information is used to indicate uplink resources used for retransmissions of the signal to be transmitted; wherein the second message comprises a radio resource control signaling, downlink control information, or an MAC CE.

Optionally, the first message further carries resource configuration information, and the resource configuration information is used to indicate the uplink resources used for retransmissions of the signal to be transmitted.

In an embodiment, optionally, the network device transmits a third message carrying beam configuration information; wherein the beam configuration information is used to indicate a target beam used for retransmissions of the signal to be transmitted; wherein the third message comprises a radio resource control signaling, downlink control information, or an MAC CE.

Optionally, the first message further carries beam configuration information, and the beam configuration information is used to indicate a target beam used for retransmissions of the signal to be transmitted.

The implementation principle and technical effect of the signal transmission method in the above-mentioned embodiment are similar to those of the above-mentioned method embodiment, which will not be repeated here.

It should be understood that although the steps in the flowcharts of FIG. 2 to FIG. 7 are illustrated in sequence according to arrows, these steps are not necessarily executed in the sequence illustrated by the arrows. Unless explicitly stated herein, the execution of these steps is not strictly limited to the order, and these steps may be performed in other orders. Furthermore, at least some of the steps in FIG. 2 to FIG. 7 may include multiple sub-steps or multiple stages. These sub-steps or stages are not necessarily executed at the same time but may be executed at different times. The order of execution of these sub-steps or stages is also not necessarily sequential but may be performed alternately or alternately with other steps or at least a portion of the sub-steps or stages of other steps.

Figure 8:
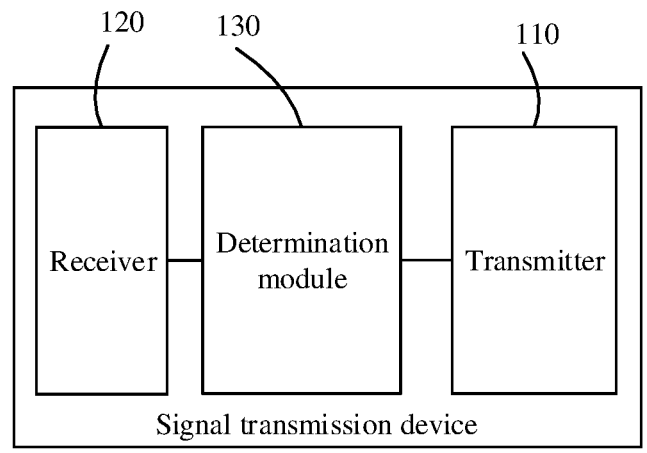
FIG. 8 is a block diagram of a signal transmission device provided by an embodiment.

FIG. 8 is a block diagram of a signal transmission device in an embodiment. As illustrated in FIG. 8, the signal transmission device includes a transmitter 110, wherein:

The transmitter 110 is configured to retransmit a signal to be transmitted using a target number of retransmissions.

Continuing as illustrated in FIG. 8, the signal transmission device further includes a receiver 120 and a determination module 130, wherein:

The receiver 120 is configured to receive a first message carrying retransmission information; the retransmission information is used to indicate the target number of retransmissions of the signal to be transmitted on a terminal device; the first message includes downlink control information.

The determination module 130 is configured to determine the target number of retransmissions according to the retransmission information.

In an embodiment, the retransmission information includes the target number of retransmissions of the signal to be transmitted or an identifier of the target number of retransmissions.

In an embodiment, the identifier of the target number of retransmissions is a target sequence number of the target number of retransmissions in a set of retransmissions; wherein the set of retransmissions is a preset set of numbers or a set of numbers configured according to a pre-configured indication.

In an embodiment, the set of retransmissions includes at least one candidate sequence number, and each candidate sequence number corresponds to one retransmission number.

In an embodiment, the determination module 130 is configured to determine a number of retransmissions corresponding to the target sequence number as the target number of retransmissions.

In an embodiment, the target number of retransmissions is a preset number of retransmissions plus a preset value, the preset value is a value determined according to a transmission attribute of each symbol in a slot, the transmission attribute is used to indicate whether the signal to be transmitted can be transmitted using the symbol.

In an embodiment, uplink resources used for each retransmission of the signal to be transmitted are same, or the uplink resources used for each retransmission of the signal to be transmitted are different.

In an embodiment, the receiver 120 is configured to receive a second message carrying resource configuration information; wherein the resource configuration information is used to indicate uplink resources used for retransmissions of the signal to be transmitted; wherein the second message comprises a radio resource control signaling, downlink control information, or an MAC CE.

The transmitter 110 is configured to retransmit the signal to be transmitted on the uplink resources indicated by the resource configuration information using the target number of retransmissions.

In an embodiment, the first message further carries resource configuration information, wherein the resource configuration information is used to indicate the uplink resources used for retransmissions of the signal to be transmitted.

The transmitter 110 is configured to retransmit the signal to be transmitted on the uplink resources indicated by the resource configuration information using the target number of retransmissions.

In an embodiment, the resource configuration information is a resource configuration parameter or a set of resource configuration parameters; wherein the resource configuration parameter is used to determine the uplink resources used for retransmissions of the information to be transmitted; wherein the set of resource configuration parameters includes at least one resource configuration parameter and a corresponding relationship between each resource configuration parameter and a number of transmissions.

In an embodiment, if the resource configuration information is the resource configuration parameter, the determination module 130 is configured to determine, according to the resource configuration parameter, the uplink resources used for each retransmission of the signal to be transmitted.

In an embodiment, if the resource configuration information is the set of resource configuration parameters, the determination module 130 is configured to: determine, according to the set of resource configuration parameters, a corresponding resource configuration parameter corresponding to each retransmission of the signal to be transmitted; determine, according to the corresponding resource configuration parameter, the uplink resource used for each retransmission of the signal to be transmitted.

In an embodiment, the resource configuration information includes: an indication of similarities and differences of retransmission resources, and/or a resource configuration parameter; the indication of similarities and differences of retransmission resources is used to indicate whether a configuration of uplink resources used is the same for each retransmission of the signal to be transmitted; the resource configuration parameter is used to determine the uplink resources used for each retransmission of the information to be transmitted.

In an embodiment, if the resource configuration information is the indication of similarities and differences of retransmission resources, or if the resource configuration information is the indication of similarities and differences of retransmission resources and the resource configuration parameter, the second message is downlink control information.

In an embodiment, if the indication of similarities and differences of retransmission resources indicates that the configuration of uplink resources used for each retransmission of the signal to be transmitted is different, the resource configuration parameter includes the resource configuration parameter for each retransmission of the signal to be transmitted.

In an embodiment, if the indication of similarities and differences of retransmission resources indicates that the configuration of uplink resources used for each retransmission of the signal to be transmitted is different, the resource configuration parameter includes a resource configuration parameter for an i-th transmission of the signal to be transmitted, the determination module 130 is configured to, according to the resource configuration parameter for the i-th transmission of the signal to be transmitted and a preset offset, determine a resource configuration parameter for other transmissions of the signal to be transmitted.

In an embodiment, the resource configuration parameter includes a resource block offset and/or an uplink resource index number.

In an embodiment, a target beam used for each retransmission of the signal to be transmitted is the same, or the target beam used for each retransmission of the signal to be transmitted is different.

In an embodiment, the receiver 120 is configured to receive a third message carrying beam configuration information; wherein the beam configuration information is used to indicate the target beam used for retransmissions of the signal to be transmitted; wherein the third message includes a radio resource control signaling, downlink control information, or an MAC CE.

The transmitter 110 is configured to retransmit the signal to be transmitted through the target beam using the target number of retransmissions.

In an embodiment, the first message further carries beam configuration information, and the beam configuration information is used to indicate a target beam used for retransmissions of the signal to be transmitted.

The transmitter 110 is configured to retransmit the signal to be transmitted through the target beam using the target number of retransmissions.

In an embodiment, the beam configuration information is a beam configuration parameter or a set of beam configuration parameters; the beam configuration parameter is used to enable the terminal device to determine the target beam used for each retransmission of the information to be transmitted; the set of beam configuration parameters includes: at least one beam configuration parameter and a corresponding relationship between each beam configuration parameter and a number of transmissions.

In an embodiment, if the beam configuration information is the beam configuration parameter, the determination module 130 is further configured to determine, according to the beam configuration parameter, a target beam used for each retransmission of the signal to be transmitted.

In an embodiment, if the beam configuration information is the set of beam configuration parameters, the determination module 130 is further configured to: determine a beam configuration parameter corresponding to each retransmission of the signal to be transmitted according to the set of beam configuration parameters; determine, according to the corresponding beam configuration parameter, a target beam used for each retransmission of the signal to be transmitted.

In an embodiment, the beam configuration information includes an indication of similarities and differences of retransmission beams and/or a beam configuration parameter; the indication of similarities and differences of retransmission beams is used to indicate whether the target beam used for each retransmission of the signal to be transmitted is the same; the beam configuration parameter is used to enable the terminal device to determine the target beam used for each retransmission of the information to be transmitted.

In an embodiment, if the beam configuration information is the indication of similarities and differences of retransmission beams, or if the beam configuration information is the indication of similarities and differences of retransmission beams and the beam configuration parameter, the third message is downlink control information.

In an embodiment, if the indication of similarities and differences of retransmission beams indicates that the target beam used for each retransmission of the signal to be transmitted is different, the beam indication information is used to indicate the target beam used for each transmission of the signal to be transmitted.

In an embodiment, if the indication of similarities and differences of retransmission beams indicates that the target beam used for each retransmission of the signal to be transmitted is a different beam, the beam indication information is used to indicate a beam used for a j-th transmission of the signal to be transmitted, the determination module 130 is further configured to, according to the beam for the j-th transmission of the signal to be transmitted, determine a beam for other transmissions of the signal to be transmitted.

In an embodiment, the signal to be transmitted includes an uplink control signal and a sounding reference signal.

The implementation principle and technical effect of the signal transmission device provided by the above-mentioned embodiments are similar to those of the above-mentioned method embodiments, and details are not described herein again.

Figure 9:
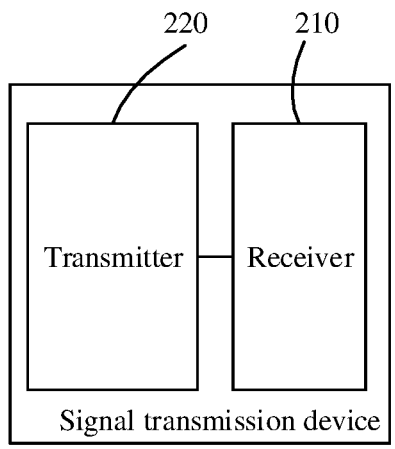
FIG. 9 is a block diagram of a signal transmission device provided by an embodiment.

FIG. 9 is a block diagram of a signal transmission device in an embodiment. As illustrated in FIG. 9, the signal transmission device includes a receiver 210, wherein:

The receiver 210 is configured to receive a signal to be transmitted that is retransmitted according to a target number of retransmissions.

In an embodiment, continuing as illustrated in FIG. 9, the signal transmission device further includes: a transmitter 220, wherein:

The transmitter 220 is configured to transmit a first message carrying retransmission information; wherein the retransmission information is used to indicate the target number of retransmissions of the signal to be transmitted on a terminal device; wherein the first message includes downlink control information.

In an embodiment, the transmitter 220 is further configured to transmit a second message carrying resource configuration information; wherein the resource configuration information is used to indicate uplink resources used for retransmissions of the signal to be transmitted; wherein the second message includes a radio resource control signaling, downlink control information, or an MAC CE.

In an embodiment, the first message further carries resource configuration information, wherein the resource configuration information is used to indicate the uplink resources used for retransmissions of the signal to be transmitted.

In an embodiment, the transmitter 220 is further configured to transmit a third message carrying beam configuration information; wherein the beam configuration information is used to indicate a target beam used for retransmissions of the signal to be transmitted; wherein the third message includes a radio resource control signaling, downlink control information, or an MAC CE.

In an embodiment, the first message further carries beam configuration information, and the beam configuration information is used to indicate a target beam used for retransmissions of the signal to be transmitted.

The implementation principle and technical effect of the signal transmission device provided by the above-mentioned embodiments are similar to those of the above-mentioned method embodiments, and details are not described herein again.

For the specific limitation of the signal transmission device, reference may be made to the foregoing limitation on the signal transmission method, which is not repeated here. Each module in the above-mentioned signal transmission device may be implemented in whole or in part by software, hardware, and a combination thereof. The foregoing modules may be built in or independent of a processor of a computer device in a hardware form or may be stored in a memory of the computer device in a software form, so that the processor invokes and performs an operation corresponding to each of the foregoing modules.

Figure 10:
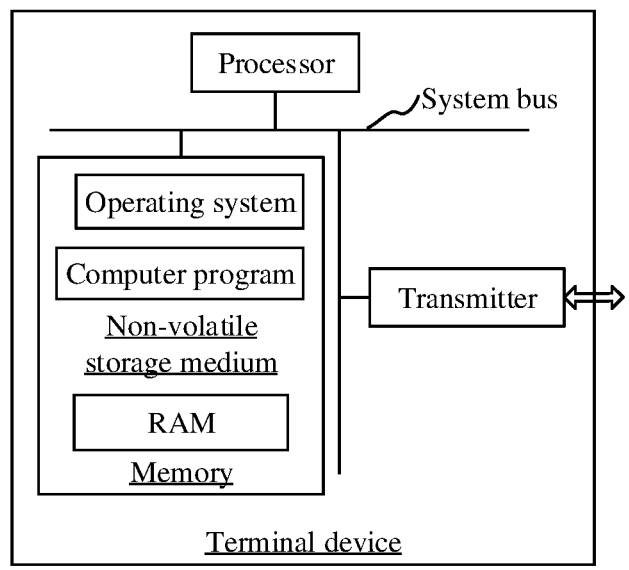
FIG. 10 is a block diagram of a terminal device provided by an embodiment.

In an embodiment, an electronic device is provided, the electronic device may be a terminal device, and its internal structure diagram may be as illustrated in FIG. 10. The electronic device includes a processor, memory, network interface, and database connected by a system bus. The processor of the electronic device is configured to provide computing and control capabilities. The memory of the electronic device includes non-volatile storage medium and a random access memory (RAM). The non-transitory storage medium stores an operating system, a computer program, and a database. The RAM provides an environment for the operation of an operating system and the computer program in the non-volatile storage medium. The database of the electronic device is used to store signal demodulation data. The network interface of the electronic device is configured to communicate with external terminals via a network connection. The computer program is executed by the processor to implement a signal transmission method. The display screen of the electronic device may be a liquid crystal display screen or an electronic ink display screen, and the input device of the electronic device may be a touch layer covered on the display screen, or be a key, a trackball, or a touch pad set on the housing of the electronic device, or may be an external keyboard, touch pad, or mouse.

Those skilled in the art will appreciate that the structure illustrated in FIG. 10 is merely a block diagram of a portion of the structure associated with the solution of the application and does not constitute a limitation on the electronic device to which the solution of the present disclosure is applied, a particular electronic device may include more or fewer components, or combine certain components, or with a different arrangement of components.

In an embodiment, a terminal device includes a transmitter, a memory, and a processor, wherein the memory stores a computer program, wherein:

The processor executes the computer program, and the transmitter is configured to retransmit a signal to be transmitted using a target number of retransmissions.

The implementation principle and technical effect of the terminal device provided by the foregoing embodiment are similar to those of the foregoing method embodiment, and details are not described herein again.

Figure 11:
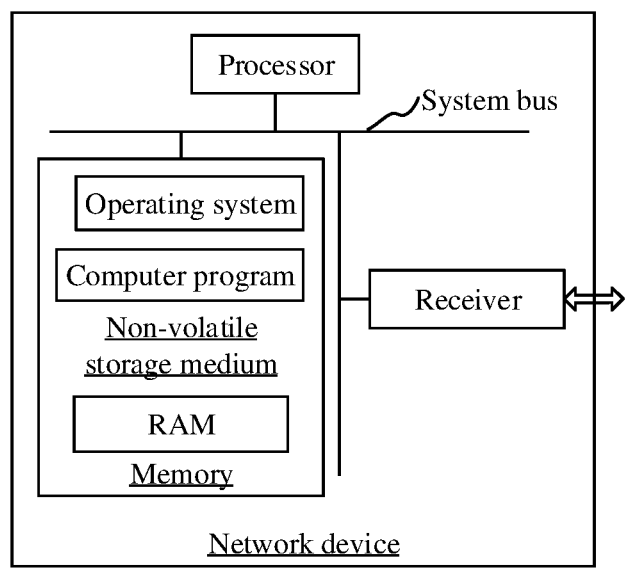
FIG. 11 is a block diagram of a network device provided by an embodiment.

In an embodiment, a network device as illustrated in FIG. 11 includes a receiver, a memory, and a processor, wherein the memory stores a computer program, wherein:

The receiver is configured to configured to receive a signal to be transmitted that is retransmitted according to a target number of retransmissions.

The processor executes the computer program.

The implementation principle and technical effect of the network device provided by the foregoing embodiment are similar to those of the foregoing method embodiment, and details are not described herein again.

In an embodiment, a computer-readable storage medium is provided on which a computer program is stored, and when the computer program is executed by a processor, the following steps are implemented:

Retransmitting a signal to be transmitted using a target number of retransmissions The implementation principle and technical effect of the computer-readable storage medium provided by the above-mentioned embodiments are similar to those of the above-mentioned method embodiments, and details are not described herein again.

In one embodiment, a computer-readable storage medium is provided on which a computer program is stored, and when the computer program is executed by a processor, the following steps are implemented:

Receiving a signal to be transmitted that is retransmitted according to a target number of retransmissions.

The implementation principle and technical effect of the computer-readable storage medium provided by the above-mentioned embodiments are similar to those of the above-mentioned method embodiments, and details are not described herein again.

Those skilled in the art understand that all or part of the processes in the methods of the foregoing embodiments may be implemented by a computer program instructing relevant hardware. The computer program may be stored in a non-transitory computer-readable storage medium. When the computer program is executed, flows of embodiments of the methods as described above may be included. Any references to memory, storage, databases, or other media used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), synchlink DRAM (SLDRAM), memory bus (Rambus) direct RAM (RDRAM), direct memory bus dynamic RAM (DRDRAM), memory bus dynamic RAM (RDRAM) etc.

Figure 12:
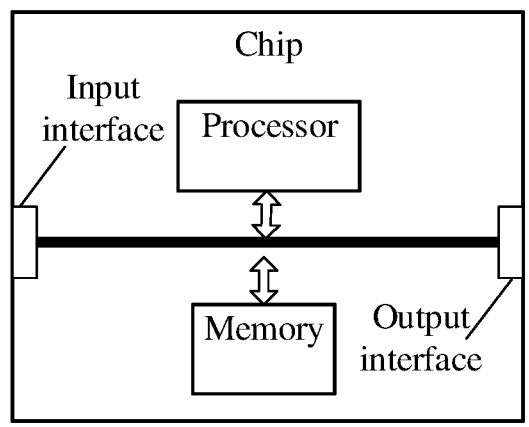
FIG. 12 is a block diagram of a chip provided by an embodiment.

In an embodiment, a chip is provided, the internal structure of which may be as illustrated in FIG. 12, including: a processor for calling and running a computer program from a memory, so that a device installed with the chip executes the above method described in the embodiments.

The implementation principle and technical effect of the chip provided by the foregoing embodiment are similar to those of the foregoing method embodiment, which will not be repeated here.

In an embodiment, a computer program product is provided, including computer program instructions, the computer program instructions causing a computer to perform the method as described in the above embodiments.

The implementation principle and technical effect of the computer program product provided by the foregoing embodiments are similar to those of the foregoing method embodiments, and details are not described herein again.

In one embodiment, a computer program is provided, the computer program causes a computer to perform the method as described in the above-mentioned method embodiments.

The implementation principle and technical effect of the computer program provided by the foregoing embodiments are similar to those of the foregoing method embodiments, and details are not described herein again.

The technical features of the above embodiments can be combined arbitrarily. In order to simplify the description, all possible combinations of the technical features in the above embodiments are not described. However, as long as there is no contradiction in the combination of these technical features, they should be considered to be within the scope of the description in this specification. The above-mentioned embodiments only represent several embodiments of the present application, and the descriptions thereof are relatively specific and detailed, but should not be construed as a limitation on the scope of the patent application. It should be noted that, for those skilled in the art, several modifications and improvements can be made without departing from the concept of the present application. These all belong to the protection scope of the present application. Therefore, the scope of protection of the patent of the present application shall be subject to the appended claims.

What is claimed is:

1. A signal transmission method, comprising:
retransmitting a signal to be transmitted using a target number of retransmissions;
receiving a first message carrying retransmission information; wherein the retransmission information is used to indicate the target number of retransmissions of the signal to be transmitted on a terminal device, and the first message comprises downlink control information carrying the retransmission information; and
determining the target number of retransmissions according to the retransmission information through the downlink control information;
wherein the target number of retransmissions is a preset number of retransmissions plus a preset value, the preset value is a value determined according to a transmission attribute of each symbol in a slot, and the transmission attribute is used to indicate whether the signal to be transmitted can be transmitted using the symbol.

2. The method according to claim 1, wherein the retransmission information comprises the target number of retransmissions of the signal to be transmitted or an identifier of the target number of retransmissions.

3. The method according to claim 2, wherein the identifier of the target number of retransmissions is a target sequence number of the target number of retransmissions in a set of retransmissions; wherein the set of retransmissions is a preset set of numbers or a set of numbers configured according to a pre-configured indication.

4. The method according to claim 3, wherein the set of retransmissions comprises at least one candidate sequence number, and each candidate sequence number corresponds to one retransmission number.

5. The method according to claim 3, wherein determining the target number of retransmissions according to the retransmission information comprises:
determining a number of retransmissions corresponding to the target sequence number as the target number of retransmissions.

6. The method according to claim 1, wherein uplink resources used for each retransmission of the signal to be transmitted are same, or the uplink resources used for each retransmission of the signal to be transmitted are different.

7. The method according to claim 6, further comprising:
receiving a second message carrying resource configuration information; wherein the resource configuration information is used to indicate uplink resources used for retransmissions of the signal to be transmitted; wherein the second message comprises a radio resource control signaling, downlink control information, or an MAC CE;
correspondingly, retransmitting the signal to be transmitted using the target number of retransmissions comprises:
retransmitting the signal to be transmitted on the uplink resources indicated by the resource configuration information using the target number of retransmissions.

8. A signal transmission method, comprising:
receiving a signal to be transmitted that is retransmitted according to a target number of retransmissions; and
transmitting a first message carrying retransmission information; wherein the retransmission information is used to indicate the target number of retransmissions of the signal to be transmitted on a terminal device, and the first message comprises downlink control information carrying the retransmission information; wherein the target number of retransmissions is determined according to the retransmission information through the downlink control information;
wherein the target number of retransmissions is a preset number of retransmissions plus a preset value, the preset value is a value determined according to a transmission attribute of each symbol in a slot, and the transmission attribute is used to indicate whether the signal to be transmitted can be transmitted using the symbol.

9. The method according to claim 8, further comprising:
transmitting a second message carrying resource configuration information; wherein the resource configuration information is used to indicate uplink resources used for retransmissions of the signal to be transmitted; wherein the second message comprises a radio resource control signaling, downlink control information, or an MAC CE.

10. A signal transmission device, comprising:
a transmitter configured to retransmit a signal to be transmitted using a target number of retransmissions;
a receiver; and
a processor, wherein:
the receiver is configured to receive a first message carrying retransmission information; the retransmission information is used to indicate the target number of retransmissions of the signal to be transmitted on a terminal device; and the first message comprises downlink control information carrying the retransmission information; and
the processor is configured to determine the target number of retransmissions according to the retransmission information through the downlink control information;
wherein the target number of retransmissions is a preset number of retransmissions plus a preset value, the preset value is a value determined according to a transmission attribute of each symbol in a slot, and the transmission attribute is used to indicate whether the signal to be transmitted can be transmitted using the symbol.

11. The device according to claim 10, wherein the retransmission information comprises the target number of retransmissions of the signal to be transmitted or an identifier of the target number of retransmissions.

12. The device according to claim 11, wherein the identifier of the target number of retransmissions is a target sequence number of the target number of retransmissions in a set of retransmissions; wherein the set of retransmissions is a preset set of numbers or a set of numbers configured according to a pre-configured indication.

13. The device according to claim 12, wherein the set of retransmissions comprises at least one candidate sequence number, and each candidate sequence number corresponds to one retransmission number.

14. The device according to claim 10, wherein the processor is configured to determine a number of retransmissions corresponding to the target sequence number as the target number of retransmissions.

15. The device according to claim 10, wherein uplink resources used for each retransmission of the signal to be transmitted are same, or the uplink resources used for each retransmission of the signal to be transmitted are different.

16. The device according to claim 10, wherein the receiver is configured to receive a second message carrying resource configuration information; wherein the resource configuration information is used to indicate uplink resources used for retransmissions of the signal to be transmitted; wherein the second message comprises a radio resource control signaling, downlink control information, or an MAC CE;
wherein the transmitter is configured to retransmit the signal to be transmitted on the uplink resources indicated by the resource configuration information using the target number of retransmissions.

* * * * *